United States Patent
Kadir et al.

(10) Patent No.: US 12,465,961 B2
(45) Date of Patent: Nov. 11, 2025

(54) METHOD FOR FLUSHING REACTOR

(71) Applicants: SABIC GLOBAL TECHNOLOGIES B.V., Bergen op Zoom (NL); LINDE AG, Munich (DE)

(72) Inventors: Suprayudi S. Kadir, Al-Jubail (SA); Yasser Battal Mutairi-Al, Al-Jubail (SA); Abdullah H. Zaydi-Al, Al-Jubail (SA)

(73) Assignees: SABIC GLOBAL TECHNOLOGIES B.V., Bergen op Zoom (NL); LINDE AG, Munich (DE)

( * ) Notice: Subject to any disclaimer, the term of this patent is extended or adjusted under 35 U.S.C. 154(b) by 25 days.

(21) Appl. No.: 18/690,000

(22) PCT Filed: Sep. 6, 2022

(86) PCT No.: PCT/EP2022/074712
§ 371 (c)(1),
(2) Date: Mar. 7, 2024

(87) PCT Pub. No.: WO2023/036767
PCT Pub. Date: Mar. 16, 2023

(65) Prior Publication Data
US 2024/0383019 A1    Nov. 21, 2024

(30) Foreign Application Priority Data
Sep. 8, 2021    (EP) ..................................... 21195447

(51) Int. Cl.
*B08B 9/08*     (2006.01)
*B01J 10/00*    (2006.01)
(Continued)

(52) U.S. Cl.
CPC .............. *B08B 9/08* (2013.01); *B01J 10/002* (2013.01); *B01J 19/002* (2013.01); *B01J 19/06* (2013.01);
(Continued)

(58) Field of Classification Search
CPC ... B08B 9/08; B08B 2209/08; B08B 2220/04; B01J 10/002; B01J 19/002; B01J 19/06; B01J 19/24; B01J 2219/00247
See application file for complete search history.

(56) References Cited

U.S. PATENT DOCUMENTS 5,990,367 A    11/1999   Stine et al.
7,745,552 B2    6/2010   Kiss et al.
(Continued)

FOREIGN PATENT DOCUMENTS

EP    1 749 808 A1    2/2007
EP    1 752 212 A1    2/2007
(Continued)

*Primary Examiner* — Sharidan Carrillo
(74) *Attorney, Agent, or Firm* — Womble Bond Dickinson (US) LLP

(57) ABSTRACT

The disclosure provides a flushing process for removing polymer fouling from a reactor including a gas distributor proximal to the bottom thereof and an internal condenser proximal to the top thereof, the method including, for a first flushing time period, injecting a flushing solvent into the reactor and withdrawing the flushing solvent from a reactor outlet proximal to the internal condenser to induce an upward movement of flushing solvent, the withdrawn flushing solvent containing a first polymer content. After the first flushing time period is complete, for a second flushing time period, the process includes injecting a flushing solvent into the reactor and withdrawing the flushing solvent from a reactor outlet proximal to the gas distributor to induce a
(Continued)

downward movement of flushing solvent, the withdrawn flushing solvent containing a second polymer content.

15 Claims, 3 Drawing Sheets

(51) Int. Cl.
*B01J 19/00* (2006.01)
*B01J 19/06* (2006.01)
*B01J 19/24* (2006.01)

(52) U.S. Cl.
CPC ...... *B01J 19/24* (2013.01); *B01J 2219/00247* (2013.01); *B08B 2209/08* (2013.01); *B08B 2220/04* (2013.01)

(56) References Cited

U.S. PATENT DOCUMENTS

| | | | |
|---|---|---|---|
| 10,214,463 | B2 | 2/2019 | Emoto |
| 2009/0214405 | A1 | 8/2009 | Schneider et al. |
| 2010/0268006 | A1 | 10/2010 | Gildenhuys |
| 2011/0028574 | A1 | 2/2011 | Woo et al. |
| 2012/0053304 | A1 | 3/2012 | Fouarge et al. |
| 2014/0296057 | A1 | 10/2014 | Ho et al. |
| 2016/0040077 | A1 | 2/2016 | Bauer et al. |
| 2016/0310925 | A1 | 10/2016 | Steynberg et al. |
| 2019/0002365 | A1 | 1/2019 | Patel et al. |
| 2019/0322965 | A1 | 10/2019 | Alqahtani et al. |
| 2020/0115296 | A1* | 4/2020 | Al-Shahrani ............. C07C 2/30 |
| 2024/0383019 | A1* | 11/2024 | Kadir .................... B01J 8/1818 |
| 2025/0050317 | A1* | 2/2025 | Korobkov ............. B01J 31/186 |

FOREIGN PATENT DOCUMENTS

| | | | |
|---|---|---|---|
| EP | 1 786 754 A2 | 5/2007 | |
| EP | 2 738 151 A1 | 6/2014 | |
| EP | 3 394 011 A1 | 10/2018 | |
| EP | 3 558 905 A1 | 10/2019 | |
| TW | 201229234 A | 7/2012 | |
| WO | WO-2009060343 A1 * | 5/2009 | ............... C07C 2/36 |
| WO | WO 2010/036446 A1 | 4/2010 | |
| WO | WO 2012/161872 A1 | 11/2012 | |
| WO | WO 2016/009360 A1 | 1/2016 | |
| WO | WO 2017/115231 A1 | 7/2017 | |
| WO | WO 2018/116176 A1 | 6/2018 | |
| ZA | 989264 B | 5/2000 | |

* cited by examiner

METHOD FOR FLUSHING REACTOR

CROSS-REFERENCE TO RELATED APPLICATIONS

The present application is a 371 U.S. national stage application of International Application No. PCT/EP2022/074712, filed Sep. 6, 2022, which claims priority from European Application No. 21195447.4, filed Sep. 8, 2021, all of which are incorporated herein by reference in their entirety.

TECHNOLOGICAL FIELD

The present disclosure relates to methods for flushing polymer fouling from a reactor, such as a reactor adapted to produce linear alpha olefin products.

BACKGROUND

Linear olefins are a class of hydrocarbons useful as raw materials in the petrochemical industry and among these the linear alpha olefins, unbranched olefins whose double bond is located at a terminus of the chain, form an important subclass. Linear alpha olefins can be converted to linear primary alcohols by hydroformylation. Hydroformylation can also be used to prepare aldehydes, which in turn can be oxidized to afford synthetic fatty acids, especially those with an odd carbon number, useful in the production of lubricants. Linear alpha olefins are also used in the production of detergents, such as linear alkylbenzenesulfonates, which are prepared by Fiedel-Crafts reaction of benzene with linear olefins followed by sulfonation.

Preparation of alpha olefins is based largely on oligomerization of ethylene, which has a corollary that the alpha-olefins produced have an even number of carbon atoms. Oligomerization processes for ethylene mainly utilize organoaluminum compounds or transition metals as catalysts. Oligomerization methods are typically carried out in the presence of a catalyst that includes a zirconium component, such as zirconium tetraisobutyrate, and an aluminum component as activator, such as ethyl aluminum sesquichloride. Typically, the effluent from the reactor used to produce the linear alpha olefins is directed to one or more distillation columns to separate the various fractions of linear alpha olefins.

Certain types of ethylene oligomerization reactors are equipped with a gas distributor proximal to the bottom of the reactor and an internal condenser proximal to the top of the reactor. One problem associated with the oligomerization reaction is polymer fouling in both the region of the internal condenser and the region of the gas distributor. Such fouling can lead to undesirable reactor shutdowns and present removal challenges. There remains a need in the art for improved reactor flushing techniques to address polymer fouling within such reactors.

BRIEF SUMMARY

Example implementations of the present disclosure are directed to processes for flushing polymer fouling from a reactor. In particular, the processes of the invention involve a multi-stage flushing technique where an upward flow of a flushing solvent is generated within the reactor in a first stage, followed by a downward flow of flushing solvent within the reactor in a second stage. The methods described are advantageous in that they provide an indication for polymer fouling in the reactor with the use of sensors that show an increase in differential pressure values beyond a certain threshold value. This enables switching of the reactor from Normal mode to Flushing mode without opening the reactor to atmosphere, which reduces reactor downtime and increases efficiency. Furthermore, system flexibility may be increased by potential inclusion of additional sensors enabling improved inspection of polymer fouling in the reactor. The described methods offer additional advantages in monitoring the level within the reactor during each flushing stage and adjust the flow of flushing solvent into the reactor to achieve a certain level. Therefore, it has been discovered that a multi-stage flushing method may provide enhanced cleaning of polymer fouling within the reactor as compared to other flushing techniques. Use of the flushing method of the present disclosure has been observed to reduce reactor downtime, reduce mechanical reactor cleaning costs, reduce chemical consumption costs, and minimize fouling rate during production.

The present disclosure includes, without limitation, the following embodiments.

Embodiment 1: A flushing process for removing polymer fouling from a reactor comprising a gas distributor proximal to the bottom of the reactor and an internal condenser proximal to the top of the reactor, the method comprising: (a) injecting a flushing solvent into the reactor at a location between the gas distributor and the internal condenser; (b) withdrawing the flushing solvent from a reactor outlet proximal to the internal condenser to induce an upward movement of flushing solvent within the reactor, the withdrawn flushing solvent containing a first polymer content; (c) continuing the (a) injecting and (b) withdrawing for a first flushing time period; (d) after the first flushing time period is complete, injecting a flushing solvent into the reactor at a location between the gas distributor and the internal condenser; (e) withdrawing the flushing solvent from a reactor outlet proximal to the gas distributor to induce a downward movement of flushing solvent within the reactor, the withdrawn flushing solvent containing a second polymer content; and (f) continuing the (d) injecting and (e) withdrawing for a second flushing time period.

Embodiment 2: The flushing process of Embodiment 1, wherein the flushing solvent injected into the reactor is at a temperature of about 150° C. or higher and at a pressure above atmospheric pressure.

Embodiment 3: The flushing process of any one of Embodiments 1 to 2, wherein the reactor operates in a normal production mode and a flushing mode, wherein the flushing process occurs during the flushing mode.

Embodiment 4: The flushing process any one of Embodiments 1 to 3, wherein one or both of a differential pressure proximal to the condenser and a differential pressure proximal to the gas distributor are monitored during normal production mode, and wherein the flushing mode is initiated based on either differential pressure rising to a predetermined threshold during the normal production mode.

Embodiment 5: The flushing process of any one of Embodiments 1 to 4, wherein the predetermined threshold for the differential pressure proximal to the condenser is about 50 mbar or higher.

Embodiment 6: The flushing process any one of Embodiments 1 to 5, wherein the predetermined threshold for the differential pressure proximal to the gas distributor is about 10 mbar or higher.

Embodiment 7: The flushing process any one of Embodiments 1 to 6, wherein the reactor is an ethylene oligomerization bubble column reactor and the normal production mode comprises bubbling ethylene gas through the gas distributor into a liquid mixture comprising a solvent and a catalyst to produce a reaction product comprising at least one linear alpha olefin and withdrawing a product stream comprising the linear alpha olefin from the reactor.

Embodiment 8: The flushing process of any one of Embodiments 1 to 7, wherein the flushing solvent injected into the reactor is injected from a flushing solvent tank.

Embodiment 9: The flushing process of any one of Embodiments 1 to 8, wherein the flushing solvent in the flushing solvent tank is maintained at one or both of a pressure of between about 5.0 and about 6.0 barg and a temperature of about 150 to about 160° C. during the flushing process.

Embodiment 10: The flushing process of any one of Embodiments 1 to 9, wherein an initial polymer concentration in the flushing solvent within the flushing solvent tank is no more than about 200 ppm at the beginning of the flushing process.

Embodiment 11: The flushing process of any one of Embodiments 1 to 10, further comprising treating the withdrawn flushing solvent containing the first polymer content and the withdrawn flushing solvent containing the second polymer content to separate the flushing solvent from at least a portion of the polymer content, and recycling the flushing solvent to the flushing solvent tank after said treating.

Embodiment 12: The flushing process any one of Embodiments 1 to 11, wherein said treating comprises passing the withdrawn flushing solvent through one or more distillation columns.

Embodiment 13: The flushing process any one of Embodiments 1 to 12, further comprising monitoring the polymer concentration in the flushing solvent tank during the flushing process, and introducing fresh flushing solvent into the flushing solvent tank to maintain the polymer concentration in the flushing solvent tank at a level of no more than about 200 ppm.

Embodiment 14: The flushing process of any one of Embodiments 1 to 13, wherein each of the first flushing time period and the second flushing time period are independently between about 12 hours and about 85 hours.

Embodiment 15: The flushing process of any one of Embodiments 1 to 14, wherein each of the first flushing time period and the second flushing time period are independently between about 24 hours and about 60 hours.

Embodiment 16: The flushing process any one of Embodiments 1 to 15, wherein the polymer fouling comprises polyethylene.

Embodiment 17: The flushing process of any one of Embodiments 1 to 16, further comprising, after the first flushing time period is complete, at least partially draining the flushing solvent remaining in the reactor prior to commencement of the second flushing time period.

Embodiment 18: The flushing process of any one of Embodiments 1 to 17, wherein the gas distributor comprises one or both of a gas sparger plate and a gas bubbler.

Embodiment 19: The flushing process of any one of Embodiments 1 to 18, wherein the flushing solvent is selected from the group consisting of aromatic hydrocarbons, aliphatic hydrocarbons, alicyclic hydrocarbons, and combinations thereof.

Embodiment 20: The flushing process of any one of Embodiments 1 to 19, wherein the flushing solvent is selected from the group consisting of toluene, xylene, mesitylene, ethyl benzene, n-pentane, n-hexane, cyclohexane, and combinations thereof.

The features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURES

Figure 1:
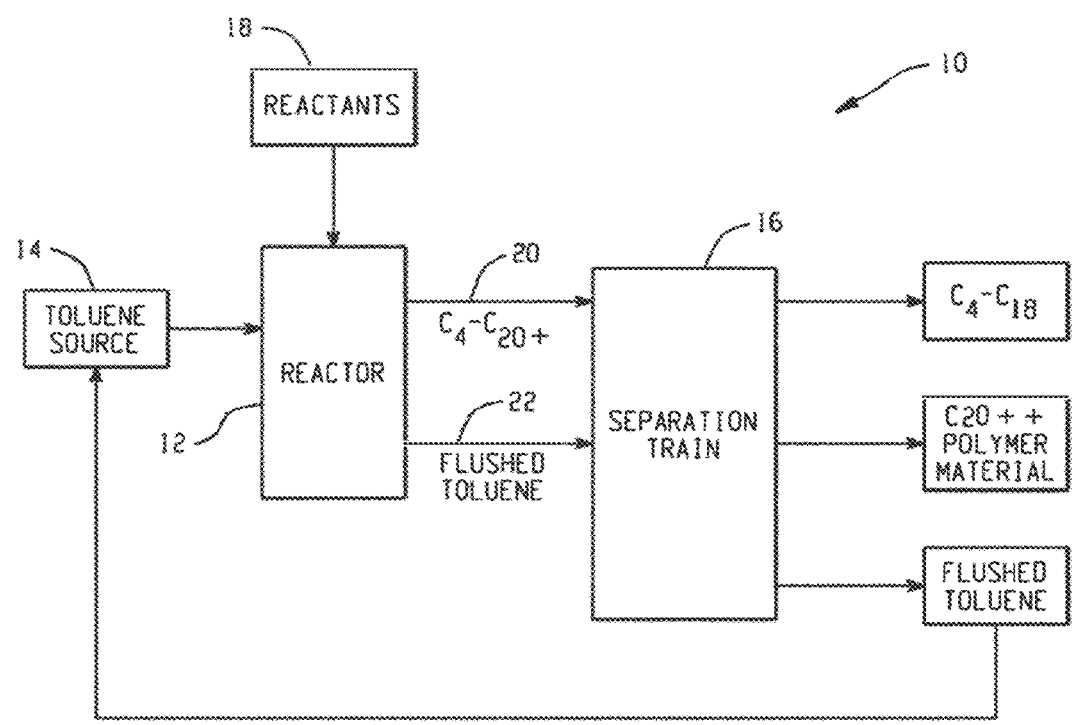
Figure 2:
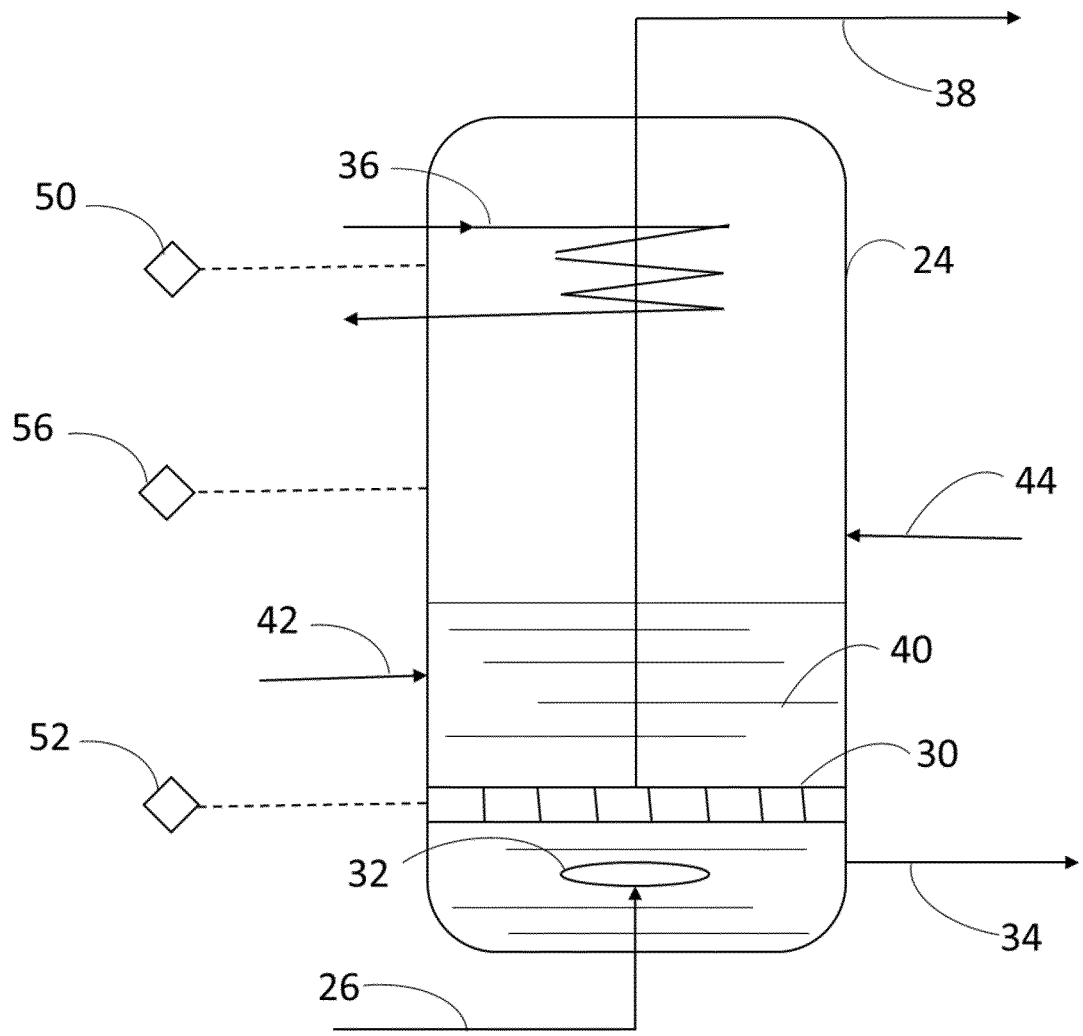
Figure 3:
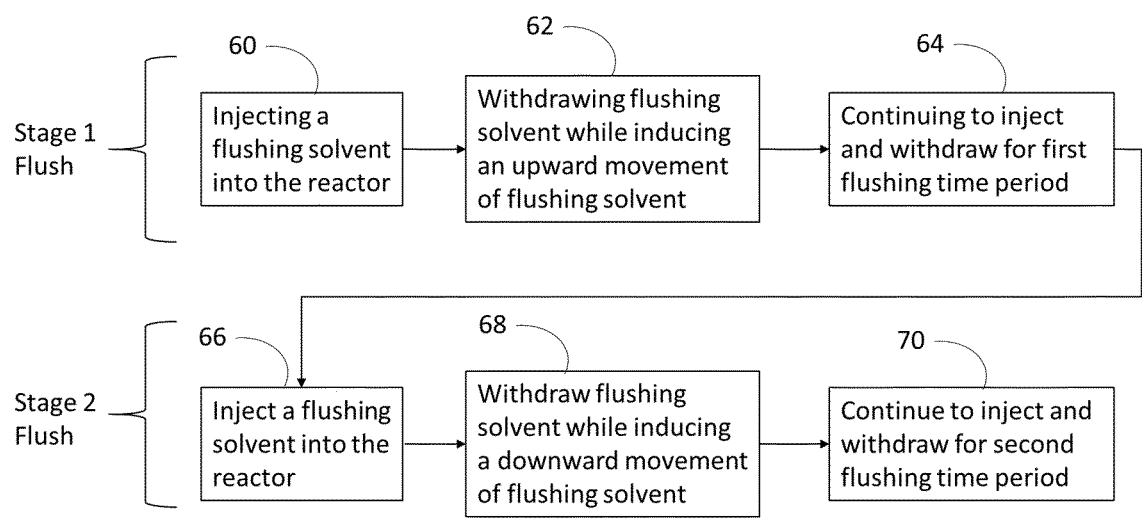

Having thus described aspects of the disclosure in the foregoing general terms, reference will now be made to the accompanying figures, which are not necessarily drawn to scale, and wherein:

FIG. 1 is a block diagram of an ethylene oligomerization system according to an example implementation of the present disclosure;

FIG. 2 is a simplified schematic diagram of an example ethylene oligomerization reactor in accordance with the present disclosure; and FIG. 3 is a block diagram of an example implementation of a reactor flushing method according to the present disclosure.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form.

Ethylene Oligomerization Process and System

Linear alpha olefins (LAOs) are olefins with a chemical formula $C_xH_{2x}$, distinguished from other mono-olefins with a similar molecular formula by linearity of the hydrocarbon chain and the position of the double bond at the primary or alpha position. Linear alpha olefins comprise a class of industrially important alpha-olefins, including 1-butene, 1-hexene, 1-octene, 1-decene, 1-dodecene, 1-tetradecene, 1-hexadecene, 1-octadecene, and higher blends of $C_{20}$-$C_{24}$, $C_{24}$-$C_{30}$, and $C_{20}$-$C_{30}$ olefins. Linear alpha olefins are useful intermediates for the manufacture of detergents, synthetic lubricants, copolymers, plasticizers, and many other important products.

Existing processes for the production of linear alpha olefins typically rely on the oligomerization of ethylene. For example, linear alpha olefins can be prepared by the catalytic oligomerization of ethylene in the presence of a Ziegler-Natta-type catalyst or non-Ziegler-Natta-type catalyst.

Oligomerization can occur at temperatures of 10 to 200° C., for example, 20 to 100° C., for example, 50 to 90° C., for example, 55 to 80° C., for example, 60 to 70° C. Operating pressures can be 1 to 5 MegaPascals (MPa), for example, 2 to 4 MPa. The process can be continuous and mean residence times can be 10 minutes to 20 hours, for example 30 minutes to 4 hours, for example, 1 to 2 hours. Residence times can be chosen so as to achieve the desired conversion at high selectivity.

The process can be conducted in solution using an inert solvent, which is non-reactive with the catalyst composition. Examples of desirable organic solvents can include, but are not limited to, aromatic hydrocarbon solvents which can be unsubstituted or substituted with halogens, for example, toluene, benzene, xylene, monochlorobenzene, dichlorobenzene, chlorotoluene; aliphatic paraffin hydrocarbons, for example, pentane, hexane, heptane, octane, nonane, decane; alicyclic hydrocarbon compounds, for example, cyclohexane, decahydronaphthalene; and halogenated alkanes, for example, dichloroethane and dichlorobutane.

The process can be carried out in any reactor, such as a loop reactor, a plug-flow reactor, or a bubble column reactor. Oligomerization of ethylene is an exothermic reaction that can be cooled by a surplus flow of ethylene. The gases leaving at a top portion of the reactor can be cooled using a series of external coolers and/or condensers. The gas phase, after further cooling, can be recycled.

A bottom stream leaving the oligomerization reactor from a bottom portion can contain the active catalyst and unreacted ethylene. The reaction can be terminated to avoid undesirable side reactions by removing catalyst components from the organic phase through extraction with a caustic aqueous phase. Contact with the caustic aqueous phase can result in formation of nonreactive minerals corresponding to the catalyst components.

The organic phase, after passage through the catalyst removal system, can pass through a molecular sieve absorption bed and can then be fed to a distillation column to recover dissolved ethylene. Recovered ethylene can be recycled via an ethylene recycle loop while the product is fed to an intermediate vessel, after which the product can be fed to a separation section. In certain embodiments, the linear alpha olefins produced from the reactor can be directed into a separation train.

As illustrated in FIG. 1, the system 10 can include a reactor 12, a toluene (or other solvent) source 14, and a separation train 16. In normal production mode, reactants 18, such as ethylene, solvent, and a catalyst can be fed into the reactor 12 to produce linear alpha olefins and a polymeric by-product material. After the reaction, a discharge stream 20 can be directed into the separation train 16, wherein the discharge stream can include unreacted reactants, the produced linear alpha olefins, such as $C_4$-$C_{20+}$, solvent, and catalyst. The separation train 16 can be configured to separate the linear alpha olefins from the solvent, catalyst, and any unreacted ethylene. The separation train 16 can separate each linear alpha olefin, for example, yielding a $C_4$ stream, $C_5$ stream, $C_6$ stream, and so on. The separation train 16 can also separate the linear alpha olefins into certain fractions, such as $C_4$-$C_{10}$ fraction, $C_{11}$-$C_{17}$ fraction, $C_{18}$-$C_{20}$ fraction, $C_{20+}$ fractions, or any other desired fraction.

The linear alpha olefin product can be isolated using procedures including aqueous caustic catalyst quench followed by water washing and final product recovery by distillation. For example, the liquid product including the solvent (e.g., toluene) with the dissolved ethylene can be fed to the separation train 16 as noted above. In a first column, the unconsumed ethylene can be separated from the linear alpha olefin product and the solvent. The ethylene can be recycled back to the reactor. The heavier fractions can be routed to the subsequent separation section where the heavier fractions can be divided into the different linear alpha olefin fractions (e.g., $C_8$, $C_{10}$, $>C_{12}$). The solvent can be recovered and also recycled back to the reactor.

Polymer fouling within the reactor can occur during the oligomerization reaction process. Such fouling is typically detected by, for example, reduced effluent flow rates, reduced internal condenser performance, increased differential pressure at various locations within the reactor, and the like. Such fouling can be treated by flushing the reactor with toluene or another solvent to remove polymeric material by-product. The flushed toluene comprising the polymeric material can be directed into a separation train comprising the linear alpha olefin reaction products. The polymeric material is soluble in at least one of the linear alpha olefins, such that the flushed toluene can exit the separation train essentially free of the polymeric material and can be recycled back to the toluene source for subsequent flushing of the reactor. The flushed toluene exiting the separation train can include less than or equal to 150 ppm, for example, less than or equal to 100 ppm, for example, less than or equal to 80 ppm, for example, less than or equal to 60 ppm, for example, less than or equal to 50 ppm of the polymeric material.

Accordingly, in a flushing mode, the reactor 12 can be flushed with toluene or another solvent from the source 14 to remove the polymeric by-product buildup in the reactor equipment. The flushed toluene containing the polymeric material can be directed into the separation train 16 via line 22. Because the polymeric material is more soluble in the $C_{20+}$ linear alpha olefins than toluene, the polymeric material can be separated from the flushed toluene and the $C_4$-$C_{18}$ fractions by dissolving into the $C_{20+}$ linear alpha olefins. As a result, in certain embodiments, the flushed toluene separated in the separation train 16 can be recycled back to the toluene source for further flushing without needing further purification. A specific flushing method of the present disclosure is set forth herein below.

Bubble Column Reactor

In an embodiment, the oligomerization process can be carried out in a bubble column reactor. FIG. 2 depicts an example bubble column reactor 24 for use in the present disclosure. Ethylene can be introduced using feed stream 26 to the reactor 24 via a gas distribution system attached to a bottom section of the bubble column reactor, which may include one or both of a gas sparger plate 30 and a gas bubbler 32. The gas distribution system disperses the gaseous ethylene evenly throughout the reactor 24. Gaseous ethylene rises up through a liquid composition 40 within the reactor 24, which typically includes linear alpha olefins, a solvent such as toluene, and a catalyst. For example, catalyst can enter the reactor 24 through a catalyst injection stream 42. Toluene or another solvent can enter the reactor 24 through solvent injection stream 44. An oligomerization reaction can occur as the gaseous ethylene interacts with the liquid composition, producing reaction products that can include polymer droplets and linear alpha olefin droplets.

The liquid heavy linear alpha olefins, together with the solvent and the catalyst, can be withdrawn from the bottom section of the reactor 24 via bottom effluent stream 34. A portion of the formed linear alpha olefins, which are gaseous under reaction conditions, can be condensed at a top portion of the reactor using an internal condenser 36 and can serve as reflux for cooling purposes, taking advantage of the respective heat of evaporation. Gaseous ethylene and light linear alpha olefins can be removed at the top of the bubble column reactor via top effluent stream 38. One or both effluent streams can be further treated using additional downstream processing units, such as condensers, heat exchangers, distillation columns, and the like. For example, a separation train as shown in FIG. 1 can be used to purify the effluent streams into various product and/or recyclable streams.

The reactor typically includes several differential pressure sensors positioned at various locations. For example, a differential pressure sensor 50 can be positioned to determine differential pressure in the region of the internal condenser. For simplicity sake, this sensor is simply shown as connected by dotted line to the condenser region of the reactor 24. The precise location of each pressure measurement used to determine differential pressure can vary so long as the locations of each measurement enable the operator to determine pressure drop across all or a portion of the condenser. In this manner, the operator can monitor the level of fouling in the condenser region of the reactor 24.

A differential pressure sensor 52 can be positioned to determine differential pressure in the region of the gas distribution system. For simplicity sake, this sensor is simply shown as connected by dotted line to the gas distribution region of the reactor 24. The precise location of each pressure measurement used to determine differential pressure can vary so long as the locations of each measurement enable the operator to determine pressure drop across all or a portion of the gas distribution system. In this manner, the operator can monitor the level of fouling in the gas distribution region of the reactor 24.

Still further, the reactor 24 can also include a differential pressure sensor 56 positioned to provide an indication of level within the reactor. Again, the precise location of each pressure measurement used to determine the differential pressure can vary so long as the locations provide a differential pressure reading that correlates to reactor level. This differential pressure sensor 56 will typically measure pressure across a central region of the reactor 24.

Flushing Method

As noted above, the reactor to be flushed will typically operate in a normal production mode and a flushing mode. Typically, the reactor will include a gas distributor proximal to the bottom of the reactor and an internal condenser proximal to the top of the reactor, such as a bubble column reactor utilized, for example, in an ethylene oligomerization process. The normal production mode for such a process will typically include bubbling ethylene gas through the gas distributor into a liquid mixture comprising a solvent and a catalyst to produce a reaction product comprising at least one linear alpha olefin and withdrawing a product stream comprising the linear alpha olefin from the reactor. An example gas distributor for such a reactor will include one or both of a gas sparger plate and a gas bubbler.

The flushing mode is typically initiated based on evidence of polymer fouling, such as polyethylene fouling, within the reactor. In certain embodiments, the presence of such fouling is determined based on monitoring of one or both of a differential pressure proximal to the condenser and a differential pressure proximal to the gas distributor during normal production mode. For example, flushing of the reactor can be initiated when a differential pressure proximal to the condenser reaches a predetermined threshold, such as about 50 mbar or higher, about 60 mbar or higher, about 70 mbar or higher, or about 80 mbar or higher. Alternatively, flushing of the reactor can be initiated, for example, when a differential pressure proximal to the gas distributor reaches a predetermined threshold, such as about 10 mbar or higher, about 15 mbar or higher, about 20 mbar or higher, or about 25 mbar or higher.

The flushing method of the present disclosure utilizes a solvent for flushing. The solvent can vary and can include any of the solvents noted herein for use in the ethylene oligomerization process. In certain embodiments, the flushing solvent is selected from aromatic hydrocarbons, aliphatic hydrocarbons, alicyclic hydrocarbons, and combinations thereof. Specific examples include toluene, xylene, mesitylene, ethyl benzene, n-pentane, n-hexane, cyclohexane, and combinations thereof.

The flushing solvent used in the flushing method is typically housed in a flushing solvent tank, such as toluene source 14 in FIG. 1. The flushing solvent is advantageously maintained at a certain minimum pressure and temperature to facilitate removal of fouling from the reactor. For example, the flushing solvent can be maintained at a temperature of about 150° C. or higher and at a pressure above atmospheric pressure, such as a pressure of between about 5.0 and about 6.0 barg (e.g., about 5.6 to about 5.8 barg) and a temperature of about 150 to about 160° C. (e.g., about 155 to about 158° C.). The solvent used for flushing should be relatively free of polymer content at the onset of the flushing process, such as solvent having an initial polymer concentration within the flushing solvent tank of no more than about 200 ppm (e.g., no more than about 150 ppm or no more than about 100 ppm) at the beginning of the flushing process.

Once the flushing mode is initiated, FIG. 3 depicts an example implementation of a flushing method of the present disclosure. The flushing advantageously occurs in two stages including a first stage where an upward movement of flushing solvent is induced and a second stage where a downward movement of flushing solvent is induced.

In one embodiment, as shown in FIG. 3, a stage one flush includes injecting a flushing solvent 60 into the reactor, typically at a location between the gas distributor and the internal condenser. The precise location can vary so long as the location of injection allows for upward movement of the flushing solvent within the reactor. The solvent is typically injected through an injection nozzle, which is optionally angled within the reactor so that a swirling action is also imparted to the solvent. The flushing solvent can be injected from more than one injection nozzle in the reactor if desired.

The flushing solvent is withdrawn 62 while inducing an upward movement of flushing solvent, typically by withdrawing the flushing solvent from a reactor outlet proximal to the internal condenser at or near the top of the reactor. The injecting 60 and withdrawing 62 of the stage one flush can continue 64 for a first flushing time period. The first flushing time period can vary, and will typically be from about 12 hours to about 85 hours, such as between about 24 hours and about 60 hours.

The first flushing time period can be preselected based on the level of polymer fouling in the reactor at the time the flushing mode is initiated, such as preselecting a flushing time period based on a measured level of differential pressure in the region of either the gas distributor or the internal condenser. Alternatively, the first flushing time period can be set by continuing to monitor the differential pressure measurements in the region of the gas distributor or the internal condenser during the flushing process and ending the flushing time period when a predetermined level of differential pressure is reached.

Once the first flushing time period is complete, the reactor is optionally at least partially drained to remove flushing solvent remaining in the reactor prior to commencement of the second flushing stage. Thereafter, a stage two flush is initiated, which typically includes injecting a flushing solvent 66 into the reactor, typically at a location between the gas distributor and the internal condenser in the same general manner described above with respect to the first stage flush. The flushing solvent is withdrawn 68 while inducing a downward movement of flushing solvent, typically by withdrawing the flushing solvent from a reactor outlet proximal to the gas distributor at or near the bottom of the reactor. The injecting 66 and withdrawing 68 of the stage two flush can continue 70 for a second flushing time period. The second flushing time period can vary, and will typically be from about 12 hours to about 85 hours, such as between about 24 hours and about 60 hours.

The second flushing time period can be preselected based on the level of polymer fouling in the reactor at the time the flushing mode is initiated, such as preselecting a flushing time period based on a measured level of differential pressure in the region of either the gas distributor or the internal condenser. Alternatively, the second flushing time period can be set by continuing to monitor the differential pressure measurements in the region of the gas distributor or the internal condenser during the flushing process and ending the flushing time period when a predetermined level of differential pressure is reached.

The withdrawn flushing solvent from both flush stages will contain a certain amount of polymer content. Accordingly, the withdrawn flushing solvent will require treatment to separate at least a portion of the polymer content before recycling the flushing solvent to the flushing solvent tank. Typically, this treatment process will include passing the withdrawn flushing solvent through one or more distillation columns. For example, the flushing solvent can be treated in a separation train 16 as described with respect to FIG. 1.

As the flushing process proceeds, it is advantageous to monitor the polymer concentration in the flushing solvent tank so that steps can be taken to maintain the polymer content within the flushing solvent tank below a preselected maximum level, such as a level of no more than about 1000 ppm, no more than about 750 ppm, no more than about 500 ppm, no more than about 250 ppm, or no more than about 200 ppm. Fresh make-up flushing solvent can be introduced into the flushing solvent tank as necessary to maintain the polymer content within the tank at the desired level.

In certain embodiments, it can be advantageous to monitor the level within the reactor during each flushing stage and adjust the flow of flushing solvent into the reactor to achieve a certain level. For example, in one embodiment, the differential pressure sensor 56 shown in FIG. 2 is monitored to determine changes in flushing solvent level within the reactor. For example, during the first flush stage (upward movement of flushing solvent) the differential pressure could be maintained in the range of about 330 to about 365 mbar. For example, during the second flush stage (downward movement of flushing solvent) the differential pressure could be maintained in the range of about 270 to about 285 mbar.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

Many modifications and other implementations of the disclosure will come to mind to one skilled in the art to which this disclosure pertains having the benefit of the teachings presented in the foregoing descriptions and the associated figures. Therefore, it is to be understood that the disclosure is not to be limited to the specific implementations disclosed herein and that modifications and other implementations are intended to be included within the scope of the appended claims. Although specific terms are employed herein, they are used in a generic and descriptive sense only and not for purposes of limitation.

What is claimed is:

1. A flushing process for removing polymer fouling from a reactor comprising a gas distributor proximal to a bottom of the reactor and an internal condenser proximal to a top of the reactor, the method comprising:
   (a) removing polymer fouling by injecting a flushing solvent into the reactor at a location between the gas distributor and the internal condenser;
   (b) withdrawing the flushing solvent from a reactor outlet proximal to the internal condenser to induce an upward movement of flushing solvent within the reactor, the withdrawn flushing solvent containing a first polymer content;
   (c) continuing the (a) injecting and (b) withdrawing for a first flushing time period;

(d) after the first flushing time period is complete, injecting the flushing solvent into the reactor at the location between the gas distributor and the internal condenser;

(e) withdrawing the flushing solvent from a reactor outlet proximal to the gas distributor to induce a downward movement of flushing solvent within the reactor, the withdrawn flushing solvent containing a second polymer content; and (f) continuing the (d) injecting and (e) withdrawing for a second flushing time period.

2. The flushing process of claim 1, wherein the flushing solvent injected into the reactor is at a temperature of about 150° C. or higher and at a pressure above atmospheric pressure.

3. The flushing process of claim 1, wherein the reactor operates in a normal production mode and a flushing mode, wherein the flushing process occurs during the flushing mode.

4. The flushing process of claim 1, wherein the flushing solvent injected into the reactor is injected from a flushing solvent tank, and optionally wherein an initial polymer concentration in the flushing solvent within the flushing solvent tank is no more than about 200 ppm at the beginning of the flushing process.

5. The flushing process of claim 1, wherein each of the first flushing time period and the second flushing time period are independently between about 12 hours and about 85 hours.

6. The flushing process of claim 1, further comprising, after the first flushing time period is complete, at least partially draining the flushing solvent remaining in the reactor prior to commencement of the second flushing time period.

7. The flushing process of claim 1, wherein the gas distributor comprises one or both of a gas sparger plate and a gas bubbler.

8. The flushing process of claim 1, wherein the flushing solvent is selected from the group consisting of aromatic hydrocarbons, aliphatic hydrocarbons, alicyclic hydrocarbons, and combinations thereof.

9. The flushing process of claim 3, wherein one or both of a differential pressure proximal to the condenser and a differential pressure proximal to the gas distributor are monitored during the normal production mode, and wherein the flushing mode is initiated based on either differential pressure rising to a predetermined threshold during the normal production mode.

10. The flushing process of claim 4, wherein the flushing solvent in the flushing solvent tank is maintained at one or both of a pressure of between about 5.0 and about 6.0 barg and a temperature of about 150 to about 160° C. during the flushing process.

11. The flushing process of claim 4, further comprising treating the withdrawn flushing solvent containing the first polymer content and the withdrawn flushing solvent containing the second polymer content to separate the flushing solvent from at least a portion of the first polymer content and the second polymer content, and recycling the flushing solvent to the flushing solvent tank after said treating.

12. The flushing process of claim 9, wherein the predetermined threshold for the differential pressure proximal to the condenser is about 50 mbar or higher and/or wherein the predetermined threshold for the differential pressure proximal to the gas distributor is about 10 mbar or higher.

13. The flushing process of claim 9, wherein the reactor is an ethylene oligomerization bubble column reactor and the normal production mode comprises bubbling ethylene gas through the gas distributor into a liquid mixture comprising a solvent and a catalyst to produce a reaction product comprising at least one linear alpha olefin and withdrawing a product stream comprising the linear alpha olefin from the reactor, and wherein the polymer fouling comprises polyethylene.

14. The flushing process of claim 11, wherein said treating comprises passing the withdrawn flushing solvent through one or more distillation columns.

15. The flushing process of claim 11, further comprising monitoring the initial polymer concentration in the flushing solvent tank during the flushing process, and introducing fresh flushing solvent into the flushing solvent tank to maintain the polymer concentration in the flushing solvent tank at a level of no more than about 200 ppm.

* * * * *